No. 721,142. PATENTED FEB. 24, 1903.
E. L. BRAXTON.
FERTILIZER DISTRIBUTER.
APPLICATION FILED JULY 24, 1902.
NO MODEL. 2 SHEETS—SHEET 1.
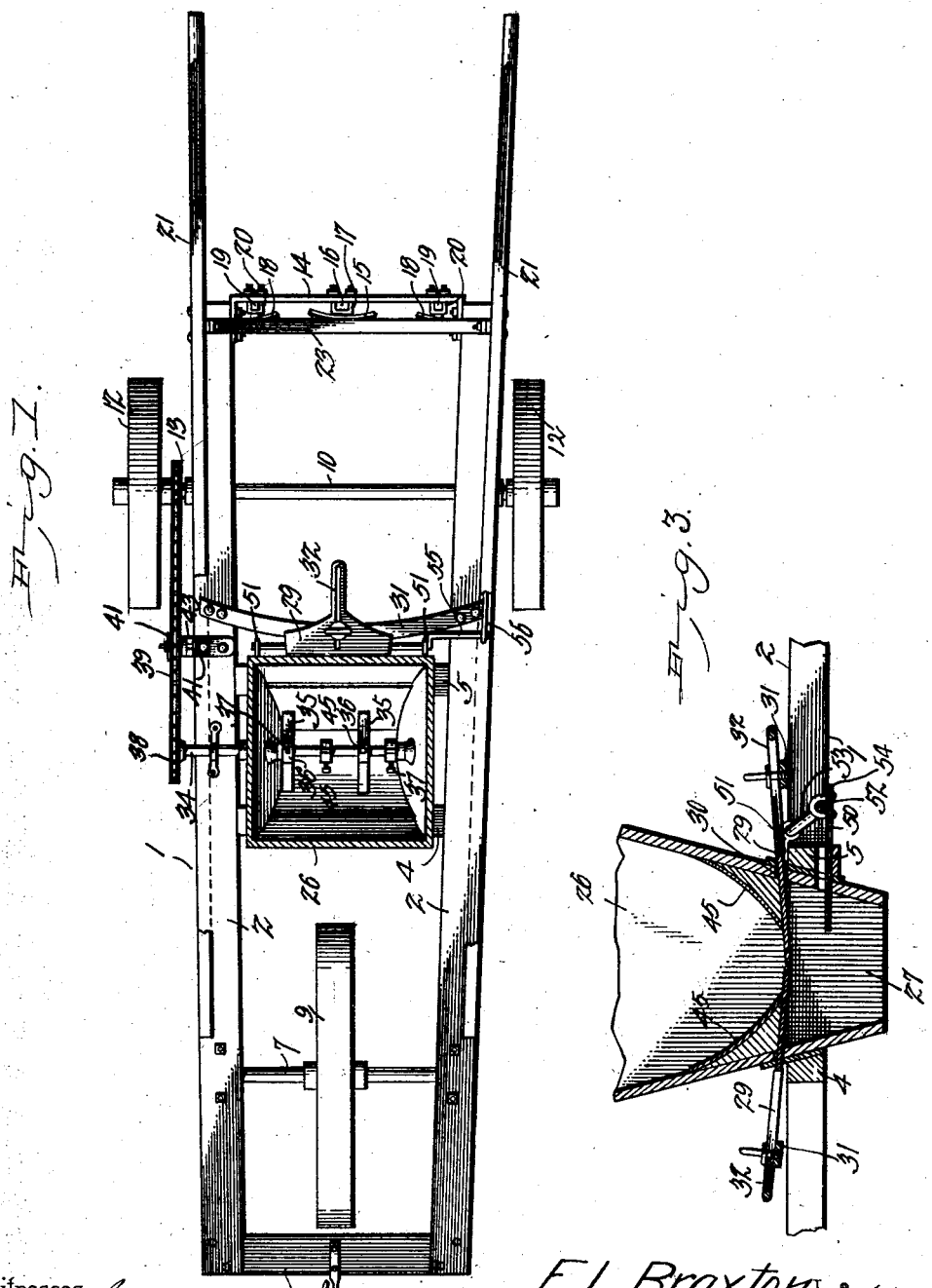

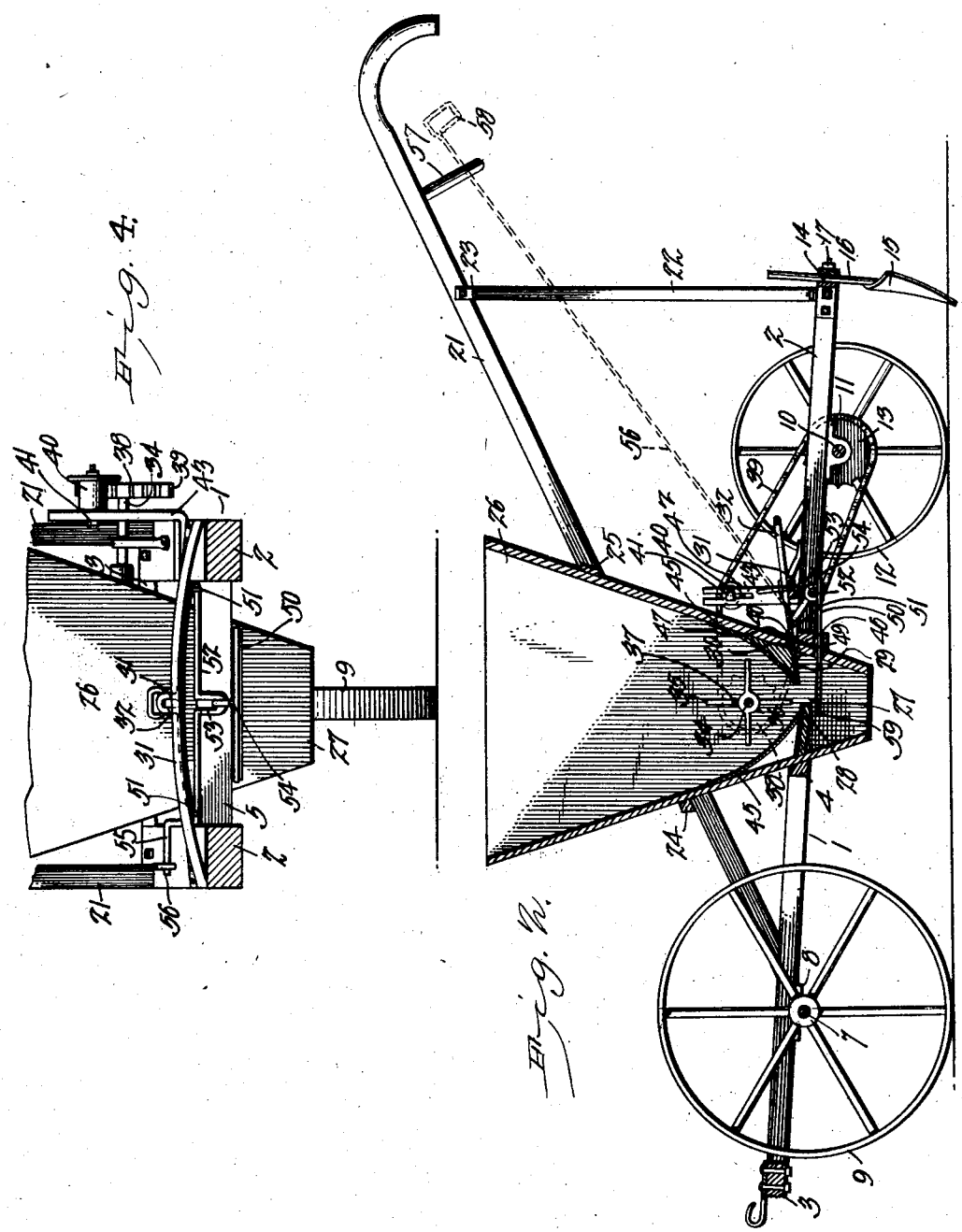

UNITED STATES PATENT OFFICE.

ELIAS L. BRAXTON, OF PACTOLUS, NORTH CAROLINA.

FERTILIZER-DISTRIBUTER.

SPECIFICATION forming part of Letters Patent No. 721,142, dated February 24, 1903.

Application filed July 24, 1902. Serial No. 116,863. (No model.)

*To all whom it may concern:*

Be it known that I, ELIAS LAFAYETTE BRAXTON, a citizen of the United States, residing at Pactolus, in the county of Pitt and State of North Carolina, have invented a new and useful Fertilizer-Distributer, of which the following is a specification.

This invention relates to fertilizer-distributers adapted for depositing fertilizing material in furrows in such quantities as may be desired; and it has for its object to provide a device of this class which shall possess superior advantages in point of simplicity, durability, and general efficiency.
A special object of my invention is to provide a fertilizer-distributer having an adjustable feed with a cut-off which at any time when it is thrown into operation shall operate to prevent the fertilizing material from dropping, thus making it unnecessary to operate and readjust the feed-adjusting slide or slides.

My invention consists in the improved construction, arrangement, and combination of parts, which will be hereinafter fully described, and particularly pointed out in the claims.

In the accompanying drawings, Figure 1 is a top plan view of a fertilizer-distributer constructed in accordance with my invention, the machine being shown partly in section in order that important parts may be exposed to view. Fig. 2 is a longitudinal vertical sectional view. Fig. 3 is a detail sectional view showing a modification. Fig. 4 is a sectional detail view taken in rear of the hopper and looking in a forward direction.

Corresponding parts in the several figures are indicated by like characters of reference.

In the embodiment of my invention I provide a frame 1, which comprises a pair of side bars 2, a front connecting-bar 3, and a pair of cross-bars 4 5, which connect the side bars together and are disposed at points near the centers of the said side bars. A shaft or axle 7 is disposed transversely of the frame 1 at a suitable distance from the front end thereof and is journaled in suitable bearings 8, one of which is indicated in Fig. 2. On the central portion of the said shaft 7 is a front supporting-wheel 9. A shaft or axle 10 is disposed transversely of the frame, near the rear end thereof, and is journaled in suitable bearings 11, which are secured to the under sides of the bars 2. On the said shaft are mounted a pair of supporting and traction wheels 12, which are disposed at opposite sides of the frame 1. A sprocket-wheel 13 is also secured to said shaft 10 and is disposed between the frame 1 and one of the traction-wheels.

A metallic transversely-disposed bar 14 connects the rear ends of the side bars 2 and is here shown as bolted thereto. A centrally-disposed stirring shovel or point 15 has its standard 16 secured on the front side of the bar 14, at the center thereof, by a clip-bolt 17. Hence the said stirring shovel or point may be vertically adjusted and caused to operate in the bottom of the furrow at any desired depth in the soil. On opposite sides of the stirring shovel or point 15 are coverers or shovels 18, which operate at the sides of the furrow and the standards 19 of which are secured to the cross-bar 14 by clip-bolts 20. Said coverers are consequently also vertically adjustable.

A pair of handles 21 have their front ends secured to the side bars 2 at a suitable distance from the front end of the frame 1. A pair of braces 22, preferably consisting of iron bars, have their lower ends secured on the side bars 2, near the rear ends thereof, and their upper ends secured to the inner sides of the handles 21. A cross-bar 23 has its ends disposed between and secured to the upper ends of the braces 22 and also secured to the handles. A pair of cross-bars 24 25 also connect the handles 21 together and are disposed at suitable distances from the front ends thereof.

The hopper 26 is of downwardly-tapering form. The lower portion of the hopper is disposed in the opening of the frame 1, formed between the cross-bars 4 5 and the sides of the frame. The upper portion of the hopper is disposed between the handles 21, and the cross-bars 24 25, which connect the handles, lie, respectively, against the front and rear sides of the upper portion of the hopper and are secured thereto. Thus the hopper is firmly secured to the frame and is braced by the handles and by the said cross-bars 24 25. The lower contracted portion of the hopper forms a discharge-spout 27. In the form of my invention shown in Fig. 2 the hopper is provided with a bottom board 28, with which coacts the cut-off slide-plate 29, which operates in the opening 30 in the rear side of the hopper, is supported by the rear side of the hopper and by a supporting-plate, which will presently be more fully described, and is movable to and from the bottom board 28 to form a discharge-opening of any desired width and which may when desired be utilized to entirely cut off the discharge of fertilizing material from the hopper when said cut-off plate is closed against the bottom board 28. The rear portion of the said cut-off plate, which projects rearwardly from the hopper, is supported on a cross-bar 31, which connects the side bars 2. The rear projecting portion of the cut-off plate is shaped to form a handle having a longitudinal slot 32, in which operates a clamp-screw, which engages a threaded opening in the cross-bar 31. By means of said clamp-screw the said cut-off plate may be secured at any desired adjustment, and by appropriately adjusting said cut-off plate the machine may be adjusted to deposit fertilizing material in any desired quantities in the furrows.

In Fig. 3 of the drawings I have illustrated a modification in which I employ a pair of the cut-off slide-plates 29, which coact to form the bottom of the hopper and to form a discharge-opening of any desired width therein, according to the adjustment of the cut-off slide-plates with relation to each other. In this modified form of my invention the bottom board 28 (shown in Fig. 2) is dispensed with, as will be readily understood. In either form of my invention I desire, however, to employ a pair of curved guide-plates 45, which serve to convey the contents of the hopper toward the discharge slot or opening formed between the cut-off slide and the bottom board or between the two cut-off slides, as the case may be.

The rear side of the hopper, in addition to the slot or opening 30, has a slot 46 arranged below and parallel thereto, and to the said rear side of the hopper is secured a vertical plate 47, provided with slots 48 and 49, registering with the slots 30 and 46, respectively, the slots 30 and 48 being disposed above and the slots 46 and 49 below the cross-bar 5 of the frame. The cut-off slide 29 is supported, as already described, in the slots 30 47, and the slots 46 49 form a support for a slidable cut-off plate 50, which, as will be seen, is disposed in the hopper below the bottom board 28 and the cut-off slide 29 in such a manner that when pushed in a forward direction it may completely close the outlet of the hopper.

The cross-bar 5 is provided with rearwardly-extending brackets 51, having bearings for a rock-shaft 52, having a centrally-disposed loop or crank 53, engaging with an eye 54 upon the upper side of the cut-off plate 50, near the rear end of the latter. At one of its outer ends the rock-shaft 52 is provided with a crank 55, which has pivotal connection with an operating-rod 56, extending in an upward and rearward direction adjacent to one of the handles and supported in a loop 57 near the upper end of said handle. The connecting-rod 56 has at its upper end a handle 58, located within easy reach of the operator, who, by manipulating said connecting-rod, may operate the rock-shaft 52 so as to throw the slide 50 either in a forward or in a rearward direction, thus closing or opening the discharge end of the spout, as may be desired. The inner sides of the side pieces of the hopper may be grooved, as shown at 59, to assist in guiding and supporting the slide 50, but this is not absolutely essential.

A stirring-shaft 34 is disposed transversely of the hopper and has its bearings in the sides thereof. On the said shaft are secured a series of radial stirring-blades 35, which have collars 36, adjustably secured upon the shaft 34 by set-screws 37. In action the stirring-blades rotate above the bottom of the hopper, prevent the fertilizing material therein from becoming lodged or clogged, and feed the fertilizing material to the discharge-opening of the hopper, so that it shall be discharged evenly and continuously from the hopper into a furrow. On one end of the shaft 34 is secured a sprocket-wheel 38, which is disposed in advance of the sprocket-wheel 13 and is connected thereto by an endless sprocket-chain 39. The upper lead of said sprocket-chain passes over a tightening-pulley 40, which revolves on the bolt 41, that is adjustable in a vertical slot 42 of the standard 43, which is secured on and rises from one of the side bars 2. By adjusting said tightening-pulley 30 the sprocket-chain may be kept at the requisite tension to cause power to be conveyed from the shaft 10 to the shaft 34. By varying the sizes of the sprocket-wheels 13 and 38 the stirring-shaft 34 may be rotated at any desired degree of speed.

On one of the side bars 2 is secured a fender 43, which is below the sprocket-wheel 38, projects laterally outwardly beyond the same, extends in advance thereof, and is disposed in front of the proximate side supporting-wheel 12. The function of this member is to prevent obstructions from injuring the connections between the shafts 10 34.

A fertilizer-distributer constructed in accordance with my invention is exceedingly strong and durable, it may be manufactured at a slight cost, and it is not likely to get out of order. An important feature of my invention is the bottom slide 50, which is arranged below the feed-slide in the hopper and by means of which the feed may be entirely cut off whenever for any reason it shall be found desirable to do so. While this bottom cut-off is entirely independent from the feed-slide, it is supported by the same supporting-plate 47, which is secured to the hopper, as shown, in such position that the slots therein shall be in proximity to the upper and under sides of the cross-bar 5 of the frame. By this construction great durability is insured, and the feed-slide, as well as the bottom cut-off slide, is enabled at all times to work easily and unobstructedly.

I have tested my improved fertilizer-distributer by operating the same practically in the field, and I find that the same is thoroughly efficient and reliable in operation and may be adjusted in such manner as to distribute the fertilizing material in any desired quantities or to completely cut off the feed whenever desired.

Having thus described my invention, I claim and desire to secure by Letters Patent of the United States—

1. In a fertilizer-distributer, the combination of a frame, of a hopper supported between cross-bars of said frame, brackets extending from the rear cross-bar, a rock-shaft journaled in said bracket, a bottom cut-off slide arranged to slide longitudinally in the lower part of the hopper contiguous to the under side of the rear hopper-supporting cross-bar and having an eye in its upper side, a crank upon the rock-shaft connected with said eye, and a rod for operating said rock-shaft, said rod being connected with a crank at the outer end of said rock-shaft, substantially as set forth.

2. In a fertilizer-distributer, the frame, the cross-bars connecting the side bars of said frame, the hopper supported between said cross-bars, the handles, the cross-bars connecting said handles and supporting the front and rear sides of the hopper, adjustable feed mechanism in said hopper, a cut-off plate in the lower end of the latter, a rock-shaft having a crank loosely connected with said cut-off plate, and a connecting-rod, having one end connected with a crank at the upper end of said rock-shaft and supported at its other end in a loop upon one of the handles, substantially as set forth.

In testimony that I claim the foregoing as my own I have hereto affixed my signature in the presence of two witnesses.

ELIAS L. BRAXTON.

Witnesses:
W. J. DILLON,
J. H. JOCHUM, Jr.